US010614744B2

(12) United States Patent
Kim et al.

(10) Patent No.: US 10,614,744 B2
(45) Date of Patent: Apr. 7, 2020

(54) DISPLAY PANEL AND A DRIVING MODULE OF THE DISPLAY PANEL

(71) Applicant: SAMSUNG ELECTRONICS CO., LTD., Suwon-si, Gyeonggi-Do (KR)

(72) Inventors: Jeehwal Kim, Seoul (KR); Kiho Kong, Suwon-si (KR); Youngmin Kim, Osan-si (KR); Wangsuk Sung, Seoul (KR); Euihyuk Jeong, Hwaseong-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 249 days.

(21) Appl. No.: 15/587,932

(22) Filed: May 5, 2017

(65) Prior Publication Data

US 2018/0018913 A1 Jan. 18, 2018

(30) Foreign Application Priority Data

Jul. 14, 2016 (KR) ........................ 10-2016-0089384

(51) Int. Cl.
*H04N 17/00* (2006.01)
*G09G 3/20* (2006.01)

(52) U.S. Cl.
CPC ..... *G09G 3/2092* (2013.01); *G09G 2310/027* (2013.01); *G09G 2310/0243* (2013.01); *G09G 2310/0278* (2013.01); *G09G 2310/0289* (2013.01); *G09G 2310/0291* (2013.01); *G09G 2320/0693* (2013.01); *G09G 2330/028* (2013.01)

(58) Field of Classification Search
CPC ..... G09G 2310/0243; G09G 2310/027; G09G 2310/0278; G09G 2320/0693
USPC ..... 348/180, 177, 739, 189; 345/77, 55, 156
See application file for complete search history.

(56) References Cited

U.S. PATENT DOCUMENTS

| | | | | |
|---|---|---|---|---|
| 7,180,436 | B2 | 2/2007 | Yoo | |
| 8,237,752 | B2 | 8/2012 | Chou et al. | |
| 8,289,264 | B2 | 10/2012 | So et al. | |
| 9,064,464 | B2 | 6/2015 | Saeedi et al. | |
| 2006/0145995 | A1 | 7/2006 | Kim et al. | |
| 2008/0266216 | A1* | 10/2008 | Choi .................... | G09G 3/3258 345/77 |
| 2008/0278471 | A1 | 11/2008 | Huang | |
| 2010/0163717 | A1 | 7/2010 | Chang et al. | |
| 2010/0283773 | A1* | 11/2010 | Kim ......................... | G09G 3/20 345/211 |
| 2013/0249966 | A1 | 9/2013 | Li et al. | |
| 2015/0054810 | A1 | 2/2015 | Lin et al. | |

* cited by examiner

*Primary Examiner* — Jefferey F Harold
*Assistant Examiner* — Jean W Desir
(74) *Attorney, Agent, or Firm* — F. Chau & Associates, LLC

(57) ABSTRACT

A display panel includes a display module including a plurality of pixels connected to gate lines and source lines and a driver module configured to apply driving voltages to the gate lines and the source lines. The driver module includes a driving voltage generator configured to generate the driving voltages and a calibration circuit configured to compare each of the driving voltages with a reference voltage and to output a calibration parameter according to a comparison result. The driving voltage generator calibrates each of the driving voltages using the calibration parameter.

16 Claims, 8 Drawing Sheets

DISPLAY PANEL AND A DRIVING MODULE OF THE DISPLAY PANEL

CROSS-REFERENCE TO RELATED APPLICATION

This U.S. non-provisional patent application claims priority under 35 U.S.C. § 119 to Korean Patent Application No. 10-2016-0089384, filed on Jul. 14, 2016 in the Korean Intellectual Property Office, the disclosure of which is incorporated by reference herein in its entirety.

TECHNICAL FIELD

Exemplary embodiments of the inventive concept relate to semiconductor devices, and more particularly, to a display panel and a driver module of the display panel.

DISCUSSION OF RELATED ART

A display panel can display an image using a plurality of pixels controlled by semiconductor circuits. The display panel may include a display module including the plurality of pixels and a driving module controlling the plurality of pixels through a plurality of source lines and a plurality of gate lines.

In a mobile device such as a smart phone, a smart pad, a smart watch, a virtual (or augmented) reality device, etc., the display module and the driver module combine with each other on the display panel. When the driving module combines with the display panel, levels of driving voltages, which are output to the source lines and gate lines by the driver module, may change due to a process error (e.g., during manufacturing) or a physical characteristic of the display panel. If the levels of the driving voltages change, degradation of image quality may occur in the display panel.

SUMMARY

According to an exemplary embodiment of the inventive concept, a display panel includes a display module including a plurality of pixels connected to gate lines and source lines and a driver module configured to apply driving voltages to the gate lines and the source lines. The driver module includes a driving voltage generator configured to generate the driving voltages and a calibration circuit configured to compare each of the driving voltages with a reference voltage and to output a calibration parameter according to a comparison result. The driving voltage generator calibrates each of the driving voltages using the calibration parameter.

According to an exemplary embodiment of the inventive concept, a driver module of a display panel includes a driving voltage generator configured to generate driving voltages and a calibration circuit configured to compare each of the driving voltages with a reference voltage and output calibration parameters according to a comparison result. The driving voltage generator adjusts the driving voltages using the calibration parameters.

According to an exemplary embodiment of the inventive concept, in a method of operating a driver module of a display panel, the method includes receiving a calibration command, entering a calibration mode in response to the calibration command, generating a first driving voltage, comparing the first driving voltage with a reference voltage to output a comparison result, determining a calibration parameter using the comparison result, storing the calibration parameter and calibrating the first driving voltage using the stored calibration parameter to generate a second driving voltage.

BRIEF DESCRIPTION OF THE DRAWINGS

The above and other features of the inventive concept will be more clearly understood by describing in detail exemplary embodiments thereof with reference to the accompanying drawings.

DETAILED DESCRIPTION OF THE EMBODIMENTS

Figure 1:
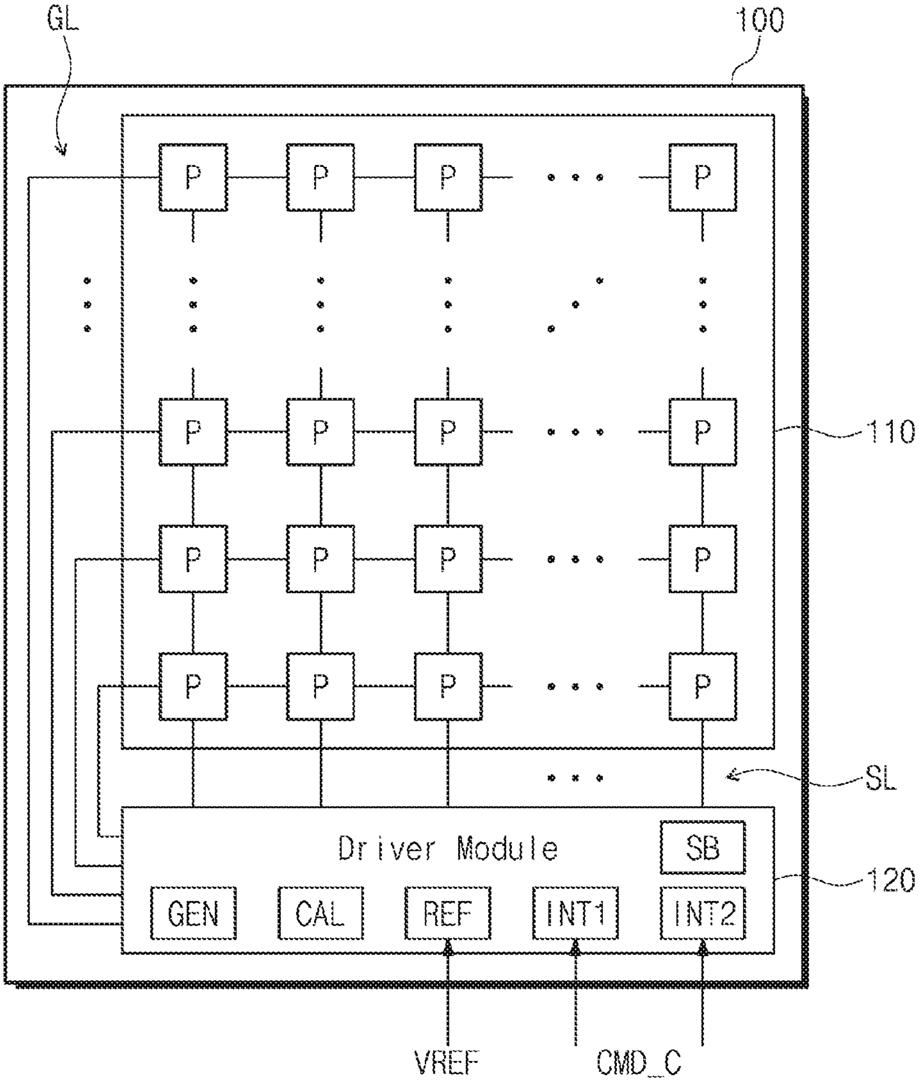
FIG. 1 is a block diagram illustrating a display panel according to an exemplary embodiment of the inventive concept.

Exemplary embodiment of the inventive concept will be described more fully hereinafter with reference to the accompanying drawings. Like reference numerals may refer to like elements throughout this application.

FIG. 1 is a block diagram illustrating a display panel according to an exemplary embodiment of the inventive concept. Referring to FIG. 1, a display panel 100 includes a display module 110 and a driver module 120.

The display module 110 includes a plurality of pixels P. The pixels P may be arranged in a matrix form. The pixels P may be connected to gate lines GL and source lines SL. For example, each pixel P may be connected to a single gate line and a single source line. Pixels P of the same row may be connected to the same gate line among the gate lines GL. Pixels P of the same column may be connected to the same source line among the source lines SL.

Pixels P may be activated or inactivated in response to gate line driving voltages transmitted through the gate lines GL. For example, the pixels P may be sequentially activated in units of rows. The activated pixels P may adjust the brightness of the display panel 100 in response to source line driving voltages transmitted through the source lines SL. According to an exemplary embodiment of the inventive concept, a portion of the plurality of pixels P arranged in a plurality of rows may be activated at substantially the same time. For example, pixels of 2 or 4 rows may be activated at substantially the same time.

The driver module 120 may generate the gate line driving voltages supplied through the gate lines GL and the source line driving voltages supplied through the source lines SL.

Hereinafter, driving voltages may refer to the gate line driving voltages, the source line driving voltages or both of them.

The driver module 120 includes a driving voltage generator GEN, a calibration circuit CAL, a reference voltage terminal REF, a first interface INT1, a second interface INT2, and a storage block SB.

The driver module 120 may have a normal mode and a calibration mode. When power is supplied to the display panel 100, the driver module 120 may enter the normal mode as an initial state. When a calibration command CMD_C is received through one of the first interface INT1 and the second interface INT2, the driver module 120 may enter the calibration mode from the normal mode. When a calibration is completed according to the calibration command CMD_C or when a command that requests the end of the calibration mode is received through one of the first interface INT1 and the second interface INT2, the driver module 120 may enter the normal mode from the calibration mode.

The driving voltage generator GEN is configured to generate the driving voltages supplied to the source lines SL and the gate lines GL. The driving voltage generator GEN may generate the driving voltages in response to a calibration parameter (CP) (or calibration parameters) stored in the storage block SB. The calibration parameter (CP) may be provided to the driving voltages and the driving voltage generator GEN may individually adjust the driving voltages (e.g., each of the source line driving voltages and/or each of the gate line driving voltages) using the calibration parameter (CP). According to an exemplary embodiment of the inventive concept, the calibration parameter (CP) may be provided to groups of the driving voltages and the driving voltage generator GEN may individually adjust the groups of the driving voltages (e.g., different groups of the source line driving voltages and/or different groups of the gate line driving voltages) using the calibration parameter (CP).

In the normal mode, when the display panel 100 is powered on, the driving voltage generator GEN may read the calibration parameter (CP) (or calibration parameters) stored in the storage block SB and may generate the driving voltages in response to the read calibration parameter (CP) (or calibration parameters). In an example, when the driver module 120 completes the calibration mode and then enters (or returns to) the normal mode, the driving voltage generator GEN may read the calibration parameter (CP) stored in the storage block SB and may generate the driving voltages in response to the read calibration parameter (CP). In another example, when driver module 120 enters the calibration mode, the driving voltage generator GEN may trace the calibration parameter (CP) being written (or updated) in the storage block (SB) and may gradually adjust the driving voltages according to the written (or updated) calibration parameter (CP).

The calibration circuit CAL may be activated in the calibration mode and may be deactivated in the normal mode. In the calibration mode, the calibration circuit CAL may compare a reference voltage VREF, received through the reference voltage terminal REF, with an output voltage of the driving voltage generator GEN, and may generate the calibration parameter (CP) according to a comparison result. The calibration circuit CAL may store the calibration parameter (CP) in the storage block SB.

In the calibration mode, the reference voltage terminal REF may provide the reference voltage VREF, received from a first external device of the display panel 100, to the calibration circuit CAL. In the normal mode, the reference voltage terminal REF may provide the reference voltage VREF, received from a second external device (e.g., the second external device being identical with or different from the first external device) of the display panel 100, to other constituent elements of the driver module 120. The reference voltage VREF of the calibration mode may be different from the reference voltage VREF of the normal mode. For example, the reference voltage VREF of the calibration mode may be a default voltage of the driving voltages and the reference voltage VREF of the normal mode may be a power supply voltage.

The first interface INT1 may be configured to communicate with a device on the outside of the display panel 100, such as a processor or an application processor. The second interface INT2 may be configured to communicate with a device on the outside of the display panel 100, such as a graphic processor or a codec. At least one of the first interface INT1 and the second interface INT2 receives the calibration command CMD_C and controls the driver module 120 to enter the calibration mode.

The storage block SB may store various parameters associated with the driver module 120 or the display panel 100. One of the various parameters stored in the storage block SB may be the calibration parameter (CP). The storage block SB may include a one-time programmable storage space that only allows read operations after a program operation is performed once.

The display module 110 may be formed on the display panel 100. The display module 110 may be formed by depositing and etching various materials on the display panel 100. The driver module 120 may be generated through a separate semiconductor process, may be attached to a free space on the display panel 100, and may combine with the display module 110. In the process of attaching the driver module 120 to the display panel 100 and combining the driver module 120 with the display module 110, the driving voltages output from the driver module 120 may be changed. For example, when an erroneous attachment or alignment, unintended high (or low) temperature, pollution or contamination of electrodes, or any other problems occur during the attachment process, a load including resistance and capacitance may be different from a target load. When the load connected to output stages of the driver module 120 is different from the target load, the driving voltages output from the driver module 120 may be different from a target value (or a designed value). When the driving voltages are different from the target value (or the designed value), image quality displayed through the display module 110 may be degraded.

The driver module 120 may combine with the display module 110 in the display panel 100 and may calibrate the driving voltages internally in response to the calibration command CMD_C received through the first interface INT1 or the second interface INT2. Thus, image quality displayed through the display panel 100 may be increased.

Figure 2:
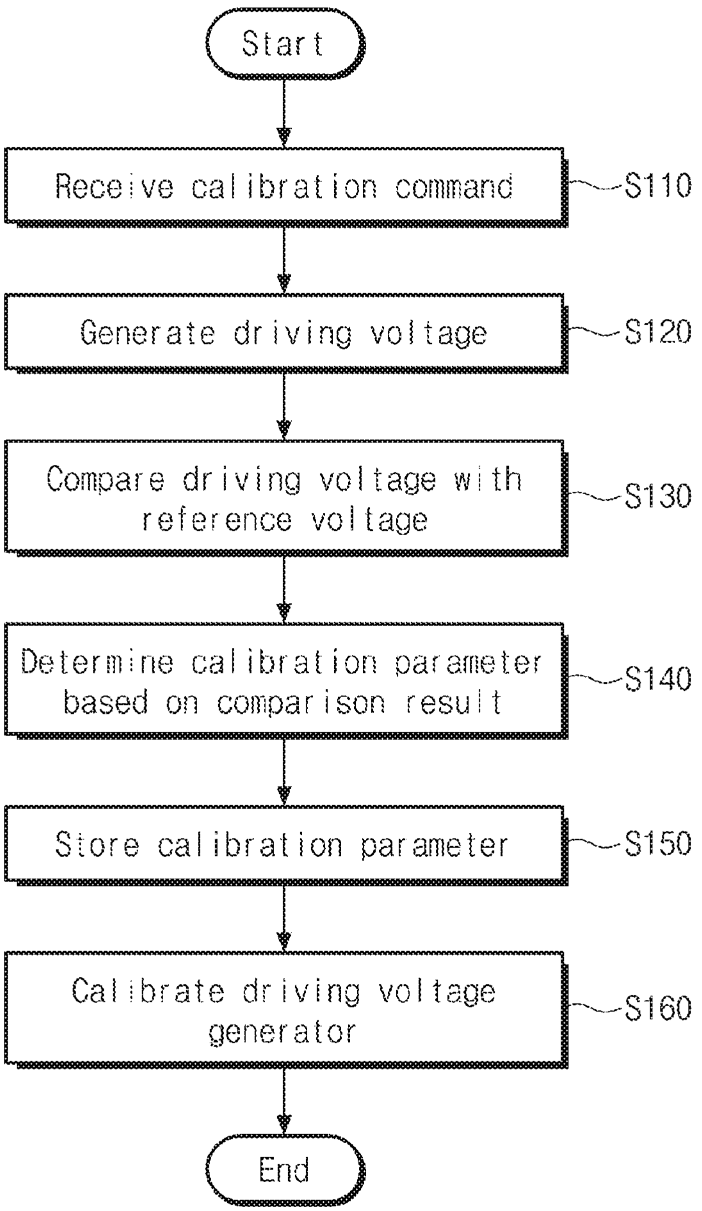
FIG. 2 is a flowchart illustrating a method of operating a driver module according to an exemplary embodiment of the inventive concept.

FIG. 2 is a flowchart illustrating a method of operating a driver module according to an exemplary embodiment of the inventive concept. Referring to FIGS. 1 and 2, in an operation S110, the driver module 120 may receive the calibration command CMD_C through one of the first interface INT1 and the second interface INT2. In response to the calibration command CMD_C, the driver module 120 may enter the calibration mode.

When the calibration command CMD_C is received, in an operation S120, the driver module 120 may generate the driving voltages. The driving voltage generator GEN may output default driving voltages corresponding to a predetermined default value (or a previously determined and used value). The driving voltage generator GEN may output the driving voltages corresponding to an initial calibration value on which an initial calibration is performed during manufacturing.

In an operation S130, the driver module 120 may compare the generated default driving voltages with the reference voltage VREF. When the driver module 120 and the calibration circuit CAL are configured to individually calibrate the driving voltages, the calibration circuit CAL may compare each of the driving voltages with the reference voltage VREF. When the driver module 120 and the calibration circuit CAL are configured to calibrate the driving voltages in groups, the calibration circuit CAL may compare a typical value (e.g., a selected typical value or an average voltage) of each of the groups of the driving voltages with the reference voltage VREF.

In an operation S140, the driver module 120 may determine the calibration parameter (CP) (or calibration parameters) according to a comparison result from operation S130. For example, the calibration circuit CAL may determine the calibration parameter (CP), which indicates how much the driving voltages should be adjusted according to a difference between the driving voltages detected by the comparison result and the reference voltage VREF. When a plurality of driving voltages is used, the driver module 120 may determine a plurality of calibration parameters corresponding to the plurality of driving voltages.

In an operation S150, the calibration circuit CAL may store the calibration parameter (CP) in the storage block SB.

In an operation S160, when the calibration mode is completed, the driving voltage generator GEN may be calibrated and may generate the driving voltages according to the calibration parameter (CP).

Figure 3:
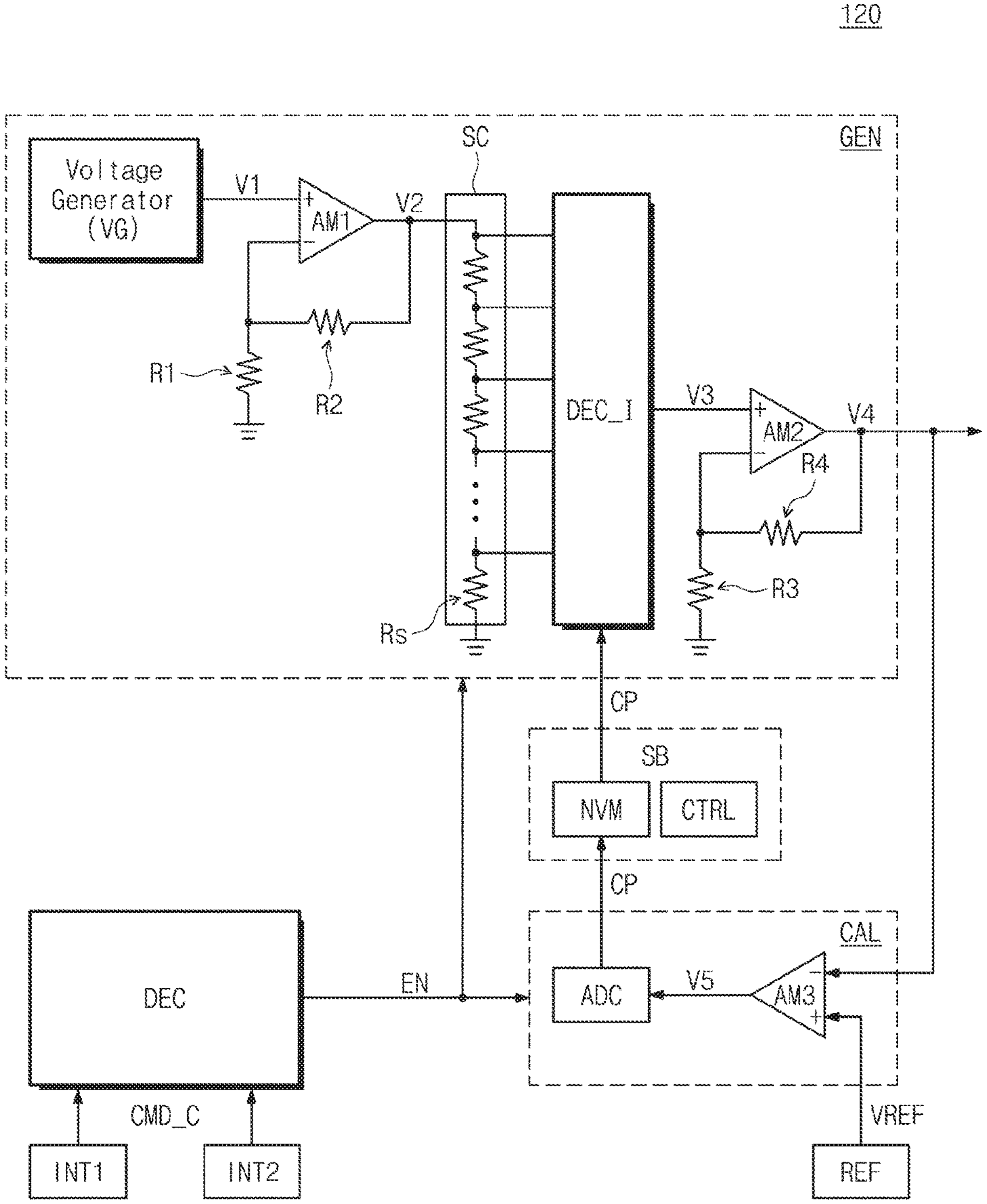
FIG. 3 illustrates a driver module of FIG. 1 according to an exemplary embodiment of the inventive concept.

FIG. 3 illustrates a driver module of FIG. 1 according to an exemplary embodiment of the inventive concept. Constituent elements of the driving module 120 for generating one driving voltage are illustrated in FIG. 3. Referring to FIGS. 1 and 3, the driver module 120 includes the driving voltage generator GEN, the calibration circuit CAL, the reference voltage terminal REF, the first interface INT1, the second interface INT2, the storage block SB, and a decoder DEC.

The driving voltage generator GEN includes a voltage generator VG, first and second amplifiers AM1 and AM2, first through fourth resistors R1 to R4, a string circuit SC, and an internal decoder DEC_I.

The voltage generator VG may generate and output a first voltage V1. The voltage generator VG may be a bandgap reference (BGR) circuit that outputs a constant voltage regardless of a change in an external environment, such as a change in temperature.

The first amplifier AM1 may amplify the first voltage V1 according to a ratio of the first resistor R1 to the second resistor R2 and may output the amplified first voltage V1 as a second voltage V2.

The string circuit SC may divide the second voltage V2 to output a plurality of voltages. The string circuit SC includes a plurality of string resistors Rs connected in series between a node, to which the second voltage V2 is provided, and a ground node. Voltages of nodes between the string resistors Rs are transmitted to the internal decoder DEC_I.

The internal decoder DEC_I may select one of the voltages transmitted from the string circuit SC in response to the calibration parameter (CP). The internal decoder DEC_I may output the selected voltage as a third voltage V3. In the case where the calibration parameter CP is not written in the storage block SB, the internal decoder DEC_I may select one voltage according to a default value read from the storage block SB.

The second amplifier AM2 may amplify the third voltage V3 according to a ratio of the third resistor R3 to the fourth resistor R4 and may output the amplified third voltage V3 as a fourth voltage V4. The fourth voltage V4 may be output as the driving voltage through one of the gate lines GL or one of the source lines SL. Alternatively, the fourth voltage V4 may be used as a basis voltage for generating the driving voltage to be output through one of the gate lines GL or one of the source lines SL.

The calibration circuit CAL may include a third amplifier AM3 and an analog-digital converter ADC. The third amplifier AM3 may compare the fourth voltage V4 with the reference voltage VREF supplied through the reference voltage terminal REF. A comparison result may be output as a fifth voltage V5.

The analog-digital converter ADC may convert the fifth voltage V5 into a digital value. The digital value, obtained by converting the fifth voltage V5, and sign information of the fifth voltage V5 may be written in the storage block SB as the calibration parameter CP.

The storage block SB includes a nonvolatile memory NVM and a controller CTRL. The controller CTRL may write the calibration parameter CP received from the calibration circuit CAL in the nonvolatile memory NVM. Additionally, the controller CTRL may read the calibration parameter CP written in the nonvolatile memory NVM and may transmit the read calibration parameter CP to the driving voltage generator GEN, for example, the internal decoder DEC_I.

The decoder DEC may interpret the calibration command CMD_C received through at least one of the first interface INT1 and the second interface INT2. When the calibration command CMD_C is received, the decoder DEC may activate an enable signal EN to activate the calibration mode of the driver module 120.

As described above, the storage block SB transmits the calibration parameter CP to the internal decoder DEC_I of the driving voltage generator GEN, and the internal decoder DEC_I selects one of the voltages of the string circuit SC in response to the calibration parameter CP. However, the storage block SB may transmit the calibration parameter CP to other constituent elements of the driving voltage generator GEN. For example, the storage block SB may transmit the calibration parameter CP to the string circuit SC of the driving voltage generator GEN. The string circuit SC may calibrate voltages output to the internal decoder DEC_I in response to the calibration parameter CP. The string circuit SC may include at least one variable resistor and may adjust output voltages by adjusting a resistance value of the variable resistor in response to the calibration parameter CP. Additionally, the string circuit SC may include at least one pair of a switch and a circuit connected in parallel, and may adjust output voltages by turning on/off the switch in response to the calibration parameter CP.

Figure 4:
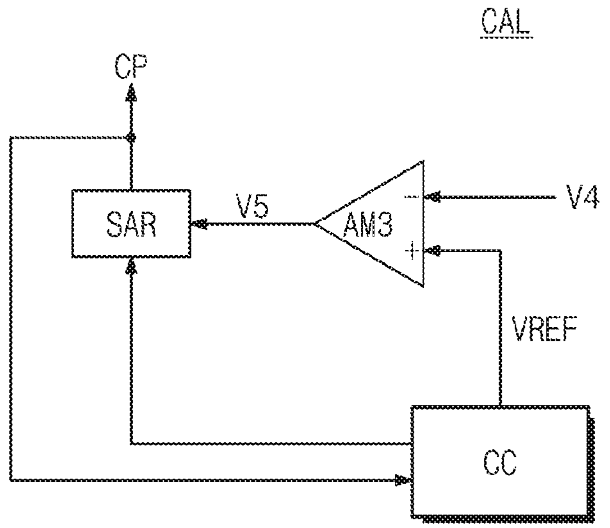
FIG. 4 illustrates a calibration circuit of FIG. 3 according to an exemplary embodiment of the inventive concept.

FIG. 4 illustrates a calibration circuit of FIG. 3 according to an exemplary embodiment of the inventive concept. Referring to FIGS. 3 and 4, the calibration circuit CAL includes the third amplifier AM3, a successive approximation register SAR, and a control circuit CC. The calibration circuit CAL may determine the calibration parameter CP through a plurality of cycles. For example, the calibration circuit CAL may sequentially detect bits from the most significant bit to the least significant bit through the plurality of cycles.

The third amplifier AM3 may compare the fourth voltage V4, output from the driving voltage generator GEN, with the reference voltage VREF, and may output a comparison result as the fifth voltage V5. The successive approximation register SAR may store one bit depending on whether the fifth voltage V5 is a positive voltage or a negative voltage. When the fifth voltage V5 is a positive voltage, the successive approximation register SAR may store '1'. When the fifth voltage V5 is a negative voltage, the successive approximation register SAR may store '0'. Each bit stored in the successive approximation register SAR is written in the storage block SB and may be read by the driving voltage generator GEN. The driving voltage generator GEN may adjust the fourth voltage V4 according to each bit that is read.

When each bit is written in the successive approximation register SAR, the control circuit CC may control the third amplifier AM3 to compare the adjusted fourth voltage V4 with the reference voltage VREF, and may control the successive approximation register SAR to store a next bit.

Figure 5:
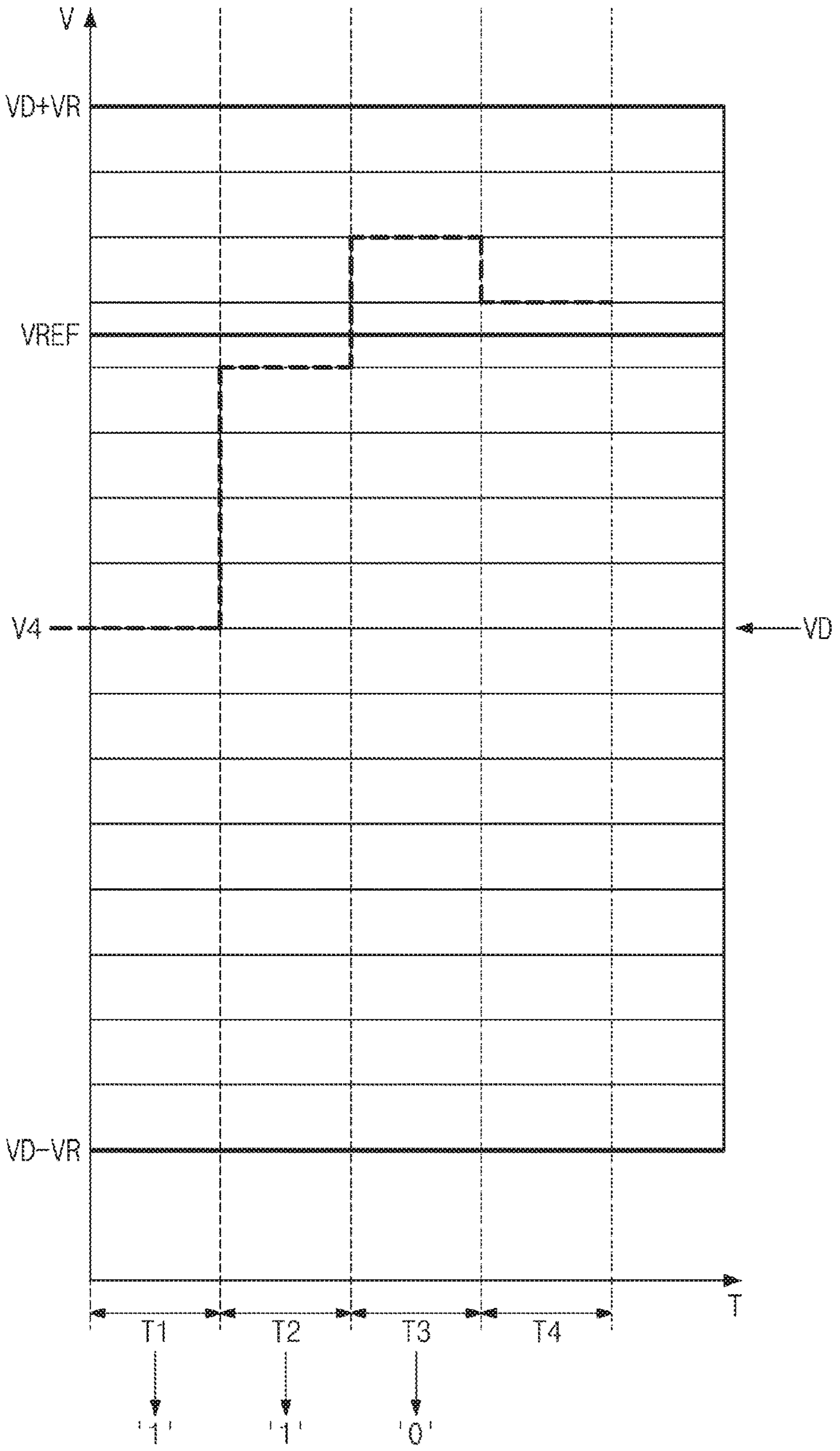
FIG. 5 illustrates an example where a driving voltage is calibrated by the calibration circuit of FIG. 4 according to an exemplary embodiment of the inventive concept.

FIG. 5 illustrates an example where a driving voltage is calibrated by the calibration circuit of FIG. 4 according to an exemplary embodiment of the inventive concept. In FIG. 5, a horizontal axis indicates time T and a vertical axis indicates a voltage V. A default driving voltage VD may be the fourth voltage V4 which the driving voltage generator GEN generates according to the calibration parameter CP having a default value. A voltage range VR may represent a range of the fourth voltage V4 which is adjustable by the string circuit SC. For example, the fourth voltage V4 may have the default driving voltage VD as a default value, and may be adjustable in a range between the sum of the default driving voltage VD and the voltage range VR (VD+VR) and the difference between the default driving voltage VD and the voltage range VR (VD−VR).

The calibration circuit CAL may have a 3-bit resolution of a most significant bit, a central significant bit, and a least significant bit. By using a comparison between the fourth voltage V4 and the reference voltage VREF, the calibration circuit CAL may adjust the fourth voltage V4 in 16 (e.g., 2^3*2) voltage sections. The most significant bit of the calibration parameter CP may have a resolution corresponding to four voltage sections. The central significant bit of the calibration parameter CP may have a resolution corresponding to two voltage sections. The least significant bit of the calibration parameter CP may have a resolution corresponding to one voltage sections.

Referring to FIGS. 3 through 5, the driving voltage generator GEN may output the default driving voltage VD as the fourth voltage V4 during a first time section T1. The third amplifier AM3 may compare the fourth voltage V4 with the reference voltage VREF. The reference voltage VREF may be a target value or a designed value of the default driving voltage VD. Since the fourth voltage V4 is lower than the reference voltage VREF, the successive approximation register SAR may store '1' as the most significant bit of the calibration parameter CP. The most significant bit having value of '1' may indicate that the fourth voltage V4 has to increase as much as the resolution of the most significant bit.

The driving voltage generator GEN may increase the fourth voltage V4 as much as the resolution of the most significant bit during a second time section T2. For example, the fourth voltage V4 may increase by as many as four voltage sections. Since the fourth voltage V4 is still lower than the reference voltage VREF, the successive approximation register SAR may store '1' as the central significant bit of the calibration parameter CP. The central significant bit having a value of '1' may indicate that the fourth voltage V4 has to increase as much as the resolution of the central significant bit.

The driving voltage generator GEN may increase the fourth voltage V4 as much as the resolution of the central significant bit during a third time section T3. For example, the fourth voltage V4 may increase by as many as two voltage sections. Since the fourth voltage V4 is now higher than the reference voltage VREF, the successive approximation register SAR may store '0' as a least significant bit of the calibration parameter CP. The least significant bit having a value of '0' may indicate that the fourth voltage V4 has to decrease as much as the resolution of the least significant bit.

During a fourth time section T4, the driving voltage generator GEN may reduce the fourth voltage V4 as much as the resolution of the least significant bit of the calibration parameter CP. For example, the fourth voltage V4 may be reduced by as many as one voltage section. In the fourth time section T4, the fourth voltage V4 may be in a state in which the calibration is completed.

When the calibration mode is completed and the driver module 120 enters the normal mode, the driving voltage generator GEN may output the fourth voltage V4 of the fourth time section T4 as the driving voltage.

As described with reference to FIG. 5, the fourth voltage V4 may be gradually calibrated to a level close to the reference voltage VREF during a plurality of cycles (or time sections).

Figure 6:
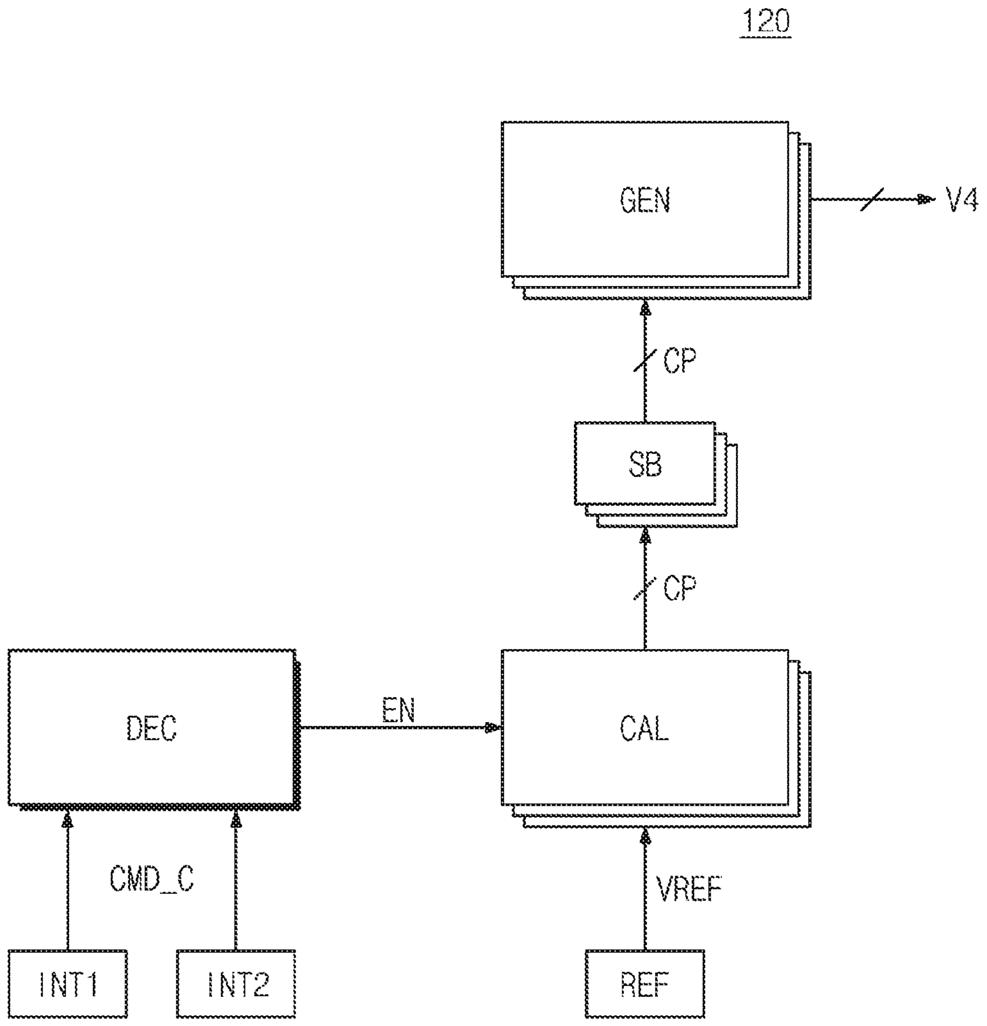
FIG. 6 illustrates the driver module of FIG. 1 that calibrates a plurality of driving voltages according to an exemplary embodiment of the inventive concept.

FIG. 6 illustrates the driver module of FIG. 1 that calibrates a plurality of driving voltages according to an exemplary embodiment of the inventive concept. Referring to FIG. 6, the driver module 120 includes a plurality of driving voltage generators GEN, a plurality of storage blocks SB, a plurality of calibration circuits CAL, the reference voltage terminal REF, the first interface INT1, the second interface INT2, and the decoder DEC.

As compared with FIG. 3, the driving voltage generators GEN, the storage blocks SB, and the calibration circuits CAL may be provided in plural.

In the calibration mode, the driving voltage generators GEN may output the fourth voltage V4 as the plurality of driving voltages or a plurality of driving voltage groups. The calibration circuits CAL may determine calibration parameters CP from the plurality of driving voltages or the plurality of driving voltage groups. The determined calibration parameters CP may be written in the storage blocks SC. The driving voltage generators GEN may calibrate or adjust the driving voltages or the driving voltage groups in response to the calibration parameters CP read from the storage blocks SB.

According to an exemplary embodiment of the inventive concept, in the calibration mode, the driver module 120 may sequentially calibrate the plurality of driving voltages or the plurality of driving voltage groups using one calibration circuit CAL.

According to an exemplary embodiment of the inventive concept, calibration parameters CP corresponding to the plurality of driving voltages or the plurality of driving voltage groups may be written in different storage spaces of one storage block SB.

According to an exemplary embodiment of the inventive concept, in the plurality of driving voltage generators GEN, except for the internal decoder DEC_I, at least one of the voltage generator VG, the first amplifier AM1 and its associated first and second resistors R1 and R2, the string circuit SC, and the second amplifier AM2 and its associated resistors R3 and R4 may be shared.

Figure 7:
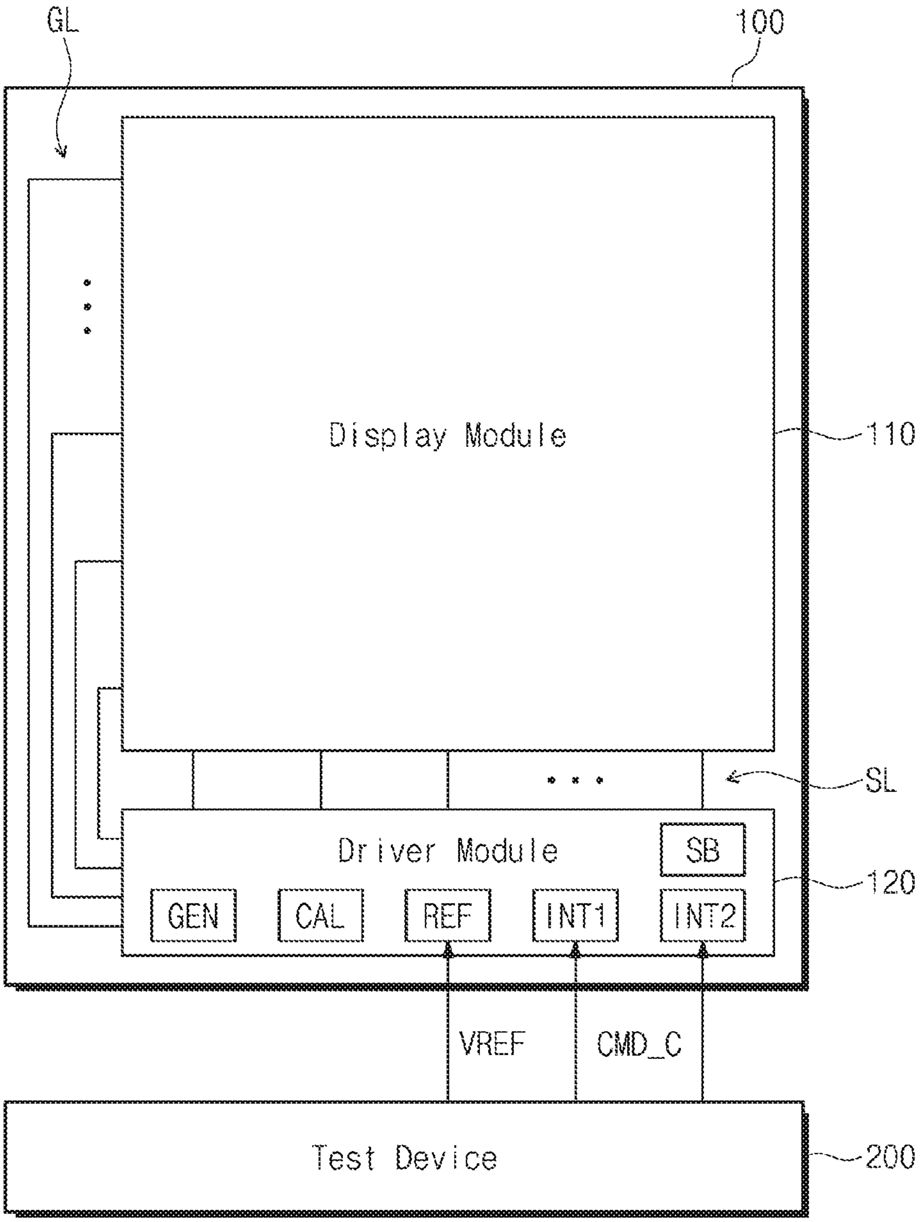
FIG. 7 illustrates an example where a test device combines with the display panel of FIG. 1 according to an exemplary embodiment of the inventive concept.

FIG. 7 illustrates an example where a test device combines with the display panel of FIG. 1 according to an exemplary embodiment of the inventive concept. In the display panel 100 illustrated in FIG. 7, for brevity of description, the pixels P described with reference to FIG. 1 are omitted.

Referring to FIG. 7, a test device 200 may supply the reference voltage VREF through the reference voltage terminal REF. The test device 200 may transmit the calibration command CMD_C through one of the first interface INT1 and the second interface INT2. In response to the reference voltage VREF and the calibration command CMD_C, the driver module 120 may internally perform the calibration of the driving voltages.

When the driving voltages are calibrated after the driver module 120 combines with the display module 110, image quality displayed through the display module 110 may be increased. Since failed display panels caused by low image quality are reduced, a yield of display panels may also be increased.

The calibration mode may be allowed only once when the manufacturing of the display panel 100 is completed. After the calibration mode is performed on the display panel 100, the display panel 100 may combine with other elements to form a mobile device.

Figure 8:
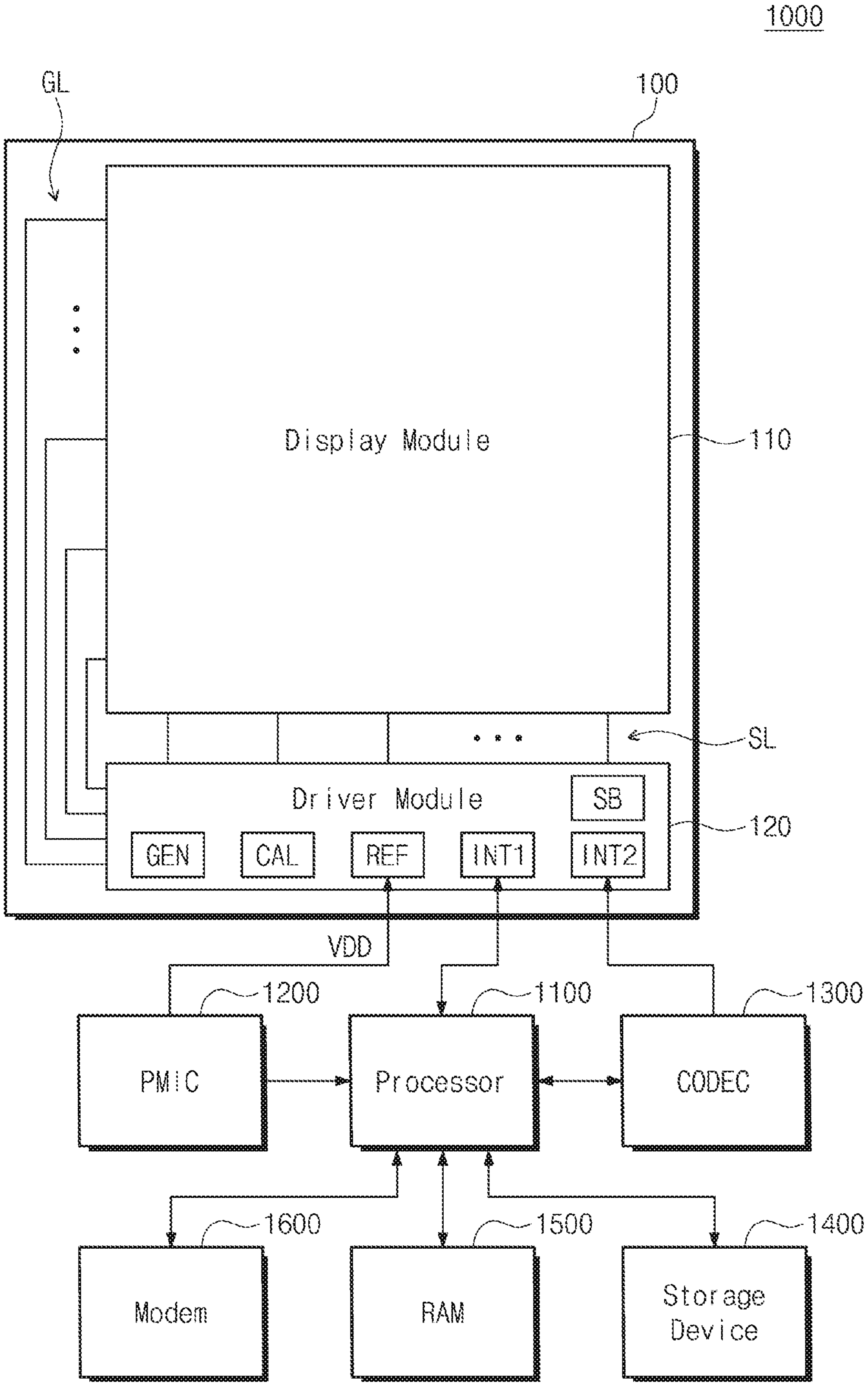
FIG. 8 is a block diagram illustrating a mobile device according to an exemplary embodiment of the inventive concept.

FIG. 8 is a block diagram illustrating a mobile device according to an exemplary embodiment of the inventive concept. Referring to FIG. 8, a mobile device 1000 includes a processor 1100, a power management integrated circuit (PMIC) 1200, a codec 1300, a storage device 1400, a random access memory (RAM) 1500, a modem 1600, and the display panel 100.

The processor 1100 may be an application processor. The processor 1100 may drive an operating system and various applications. The processor 1100 may control constituent elements of the mobile device 1000 and may manage and distribute resources. Additionally, the processor 1100 may communicate with the driver module 120 of the display panel 100 through the first interface INT1 of the driver module 120.

The PMIC 1200 may manage power supplied to the mobile device 1000. For example, the PMIC 1200 may manage a power saving mode for the constituent elements of the mobile device 1000. The PMIC 1200 may supply the power supply voltage VDD to the reference voltage terminal REF of the driver module 120.

The codec 1300 may process various image data according to requests from the processor 1100. The codec 1300 may communicate with the driver module 120 through the second interface INT2.

The storage device 1400 may be used to store long-term data under the control of the processor 1100. The long-term data may be maintained even when power of the mobile device 1000 is interrupted. The long-term data may include source data of the operating system and applications and user data generated by the operating system and applications.

The random access memory 1500 may be used to store short-term data under the control of the processor 1100. The short-term data may be maintained while power of the mobile device 1000 is maintained. The short-term data may include the operating system and instances of the applications, as well as user data temporarily managed by the operating system and applications.

The modem 1600 may perform a wireless or wired communication with an external device under the control of the processor 1100.

According to an exemplary embodiment of the inventive concept, after the calibration mode is completed for the display panel 100, the display panel 100 may combine with other elements to form the mobile device 1000. After the mobile device 1000 is formed, the driver module 120 operates only in the normal mode, and the calibration mode may be prohibited.

According to an exemplary embodiment of the inventive concept, after an initial calibration mode is completed for the display panel 100, the display panel 100 may combine with other elements to form the mobile device 1000. The initial calibration mode may be used to calibrate an error that occurs when the display panel 100 is manufactured. After the mobile device 1000 is formed, an additional calibration mode may be allowed. The additional calibration mode may be used to calibrate an error that occurs while the display panel 100 is used.

As described with reference to FIGS. 7 and 8, the reference voltage VREF of the calibration mode and the power supply voltage VDD of the normal mode are supplied through the same reference voltage terminal REF. However, a terminal to which the reference voltage VREF is supplied and a terminal to which the power supply voltage VDD is supplied may be different from each other. For example, the driver module 120 may include a terminal only used for receiving the reference voltage VREF in the calibration mode.

As described above, according to an exemplary embodiment of the inventive concept, a display panel and a driving module of the display panel may adjust or calibrate driving voltages after they combine with each other. Thus, image quality of the display panel may be increased.

While the inventive concept has been shown and described with reference to exemplary embodiments thereof, it will be apparent to those of ordinary skill in the art that various substitutions, modifications, and changes may be made thereto without departing from the scope and spirit of the present inventive concept as defined by the following claims.

What is claimed is:

1. A display panel comprising:

a display module comprising a plurality of pixels connected to gate lines and source lines; and a driver module configured to apply driving voltages to the gate lines and the source lines, wherein the driver module comprises:

a voltage terminal configured to receive a reference voltage from an external device of the display panel;

a driving voltage generator configured to generate the driving voltages; and a calibration circuit configured to compare each of the driving voltages with the reference voltage and to output a calibration parameter according to a comparison result, wherein the driving voltage generator calibrates each of the driving voltages using the calibration parameter, wherein the driving voltage generator comprises:

a voltage generator configured to generate a first voltage;

a first amplifier configured to amplify the first voltage to a second voltage;

a plurality of string resistors connected in series between a node to which the second voltage is supplied and a ground node;

a decoder configured to output one of a plurality of voltages between the string resistors as a third voltage using the calibration parameter; and a second amplifier configured to amplify the third voltage to output as each of the driving voltages.

2. The display panel of claim 1, wherein the driver module is a mobile driver module and the display module is a mobile display module.

3. The display panel of claim 1, wherein the calibration circuit is configured to receive the reference voltage from a terminal to which a voltage is supplied from outside of the display panel.

4. The display panel of claim 1, wherein the driver module further comprises a first interface configured to communicate with a first external device and a second interface configured to communicate with a second external device, and wherein the driving voltage generator and the calibration circuit adjust each of the driving voltages in response to a command received through one of the first interface and the second interface.

5. The display panel of claim 4, wherein the first interface is configured to communicate with a processor, and wherein the second interface is configured to communicate with a codec.

6. The display panel of claim 1, wherein the driver module further comprises a nonvolatile memory, wherein the calibration circuit stores the calibration parameter in the nonvolatile memory, and wherein the driving voltage generator outputs the driving voltages using the calibration parameter stored in the nonvolatile memory.

7. The display panel of claim 6, wherein the nonvolatile memory is a one-time programmable memory.

8. The display panel of claim 1, wherein the calibration circuit comprises:

an amplifier configured to perform a comparison operation to compare each of the driving voltages with the reference voltage and to output the comparison result as a fifth voltage;

a successive approximation register configured to store each bit of the calibration parameter according to the fifth voltage; and a control circuit configured to control the amplifier to perform the comparison operation a predetermined number of times and to control the successive approximation register to store each bit of the calibration parameter.

9. The display panel of claim 8, wherein the driving voltage generator adjusts the driving voltages according to each bit of the calibration parameter while the amplifier performs the comparison operation and the successive approximation register stores each bit of the calibration parameter.

10. The display panel of claim 1, wherein the driving voltage generator individually generates the driving voltages, and wherein the calibration circuit individually outputs the calibration parameters of each of the driving voltages.

11. The display panel of claim 1, wherein the driving voltages comprise source line driving voltages to be applied to the source lines and gate line driving voltages to be applied to the gate lines, and wherein the driving voltage generator and the calibration circuit adjust the source line driving voltages and the gate line driving voltages separately.

12. A display panel, comprising:

a display module comprising a plurality of pixels connected to gate lines and source lines; and a driver module configured to apply driving voltages to the gate lines and the source lines, wherein the driver module comprises:

a voltage terminal configured to receive a reference voltage from an external device of the display panel;

a driving voltage generator configured to generate the driving voltages; and a calibration circuit configured to compare each of the driving voltages with the reference voltage and to output a calibration parameter according to a comparison result, wherein the driving voltage generator calibrates each of the driving voltages using the calibration parameter, wherein the calibration circuit comprises:

an amplifier configured to compare each of the driving voltages with the reference voltage and to output the comparison result as a fifth voltage; and an analog-digital converter configured to digitize the fifth voltage and to output the digitized fifth voltage as the calibration parameter.

13. A method of operating a driver module of a display panel, the method comprising:

receiving a calibration command;

entering a calibration mode in response to the calibration command;

receiving, at a voltage terminal, a reference voltage from a first external device of the display panel;

generating a first driving voltage;

comparing the first driving voltage with the reference voltage to output a comparison result;

determining a calibration parameter using the comparison result;

storing the calibration parameter; and calibrating the first driving voltage using the stored calibration parameter to generate a second driving voltage; and receiving, at the voltage terminal, a power supply voltage from a second external device of the display panel in a normal mode that is different from the calibration mode.

14. The method of claim 13, wherein the first driving voltage has a level of a default driving voltage corresponding to a predetermined default value before calibrating the first driving voltage, and the first driving voltage is calibrated within a predetermined range.

15. The method of claim 14, wherein each bit of the calibration parameter corresponds to a number of voltage sections, and calibrating the first driving voltage comprises adjusting the first driving voltage in a positive or negative direction according to the number of voltage sections for each bit of the calibration parameter.

16. The method of claim 13, further comprising:

completing the calibration mode; and prohibiting the calibration mode after completing the calibration mode.

* * * * *